United States Patent [19]

Shimamura et al.

[11] Patent Number: 5,650,033
[45] Date of Patent: Jul. 22, 1997

[54] SPLICING TABLE

[75] Inventors: Yasunobu Shimamura; Yutaka Kiyonaga, both of Wakayama, Japan

[73] Assignee: Noritsu Koki Co., Ltd., Wakayama, Japan

[21] Appl. No.: 427,584

[22] Filed: Apr. 24, 1995

[30] Foreign Application Priority Data

Apr. 25, 1994 [JP] Japan ................................ 6-86440

[51] Int. Cl.$^6$ ................................ G03D 15/04
[52] U.S. Cl. ................ 156/353; 156/502; 156/506
[58] Field of Search ................ 156/64, 157, 159, 156/353, 361, 362, 363, 502, 505, 506

[56] References Cited

U.S. PATENT DOCUMENTS

| | | | |
|---|---|---|---|
| 3,586,571 | 6/1971 | Szakacs ........................... | 156/353 |
| 3,768,133 | 10/1973 | Scappator et al. ................ | 29/407.1 |
| 4,046,614 | 9/1977 | Zahn et al. ....................... | 156/353 |
| 4,621,970 | 11/1986 | Wurfel et al. ..................... | 414/412 |
| 4,643,371 | 2/1987 | Wurfel et al. ..................... | 242/55 |
| 4,732,278 | 3/1988 | Zangenfeind et al. ............ | 209/546 |
| 4,888,613 | 12/1989 | Zangenfeind et al. ............ | 355/41 |
| 4,894,675 | 1/1990 | Wurfe et al. ...................... | 354/308 |

FOREIGN PATENT DOCUMENTS

| | | |
|---|---|---|
| 0 437 814 | 7/1991 | European Pat. Off. . |
| 0 629 916 | 12/1994 | European Pat. Off. . |
| 2 019 204 | 11/1970 | Germany . |
| 37 37 796 | 5/1989 | Germany . |

*Primary Examiner*—James Sells
*Attorney, Agent, or Firm*—Wenderoth, Lind & Ponack

[57] ABSTRACT

A splicing table which can distinguish the kind of a film to be processed, cut the film, and connect a leader to the film. The splicing table has a recess for receiving a patrone, a film presser, and a splicing portion for connecting a leader to the cut end of the film. Under the splicing table are a bar code reader for judging whether or not the film can be developed, and a solenoid for restricting the operation of the cutter unit based on the result of judgment by the bar code reader.

1 Claim, 6 Drawing Sheets

5,650,033

1

SPLICING TABLE

BACKGROUND OF THE INVENTION

This invention relates to a splicing table for distinguishing the kind or type of a film to be processed, cutting a tongue of the film provided at a leading end thereof, and connecting a leader to the leading end.

An exposed film housed in a patrone is developed in selected one of various kinds of developing machines according to the type of the film, i.e. according to whether it is a black-and-white film, a color film or a reversal film. After pulling the end of the film out of the patrone for development, the patrone is set in a cutter device provided apart from the inlet of a developing machine to cut the tongue portion of the film.

Such a cutter device is disclosed in Japanese Utility Model Application 3-7882. This film cutter device has a recess formed in the support table for receiving a patrone containing a film, a film receiving groove provided with positioning pins adapted to engage the film pulled out of the patrone to hold it in a predetermined position, and a cutting unit comprising a fixed blade and a movable blade to cut the tongue portion of the film.

When developing a film, a leader is connected to the leading end of the film pulled out of the patrone to improve efficiency of development. The leader is formed from a flexible sheet of synthetic resin and has a plurality of square holes arranged longitudinally at equal intervals so as to engage a sprocket at the developing portion. The leader is connected to the film on a splicing table.

Heretofore, two separate devices were used to cut a film and connect a leader to the film. Namely, there has been no device which can both cut a film and connect a leader to the film. The cutter device can read a bar code printed on a patrone and indicate whether or not the film is of the type which can be developed in the developing machine. But none of such cutter devices has means for preventing the film from being cut if it is of the type which cannot be developed.

An object of this invention is to provide a splicing table which can perform a judgement of film, operations of cutting and connection to a leader in one unit, which is compact and economical, and which can prevent any wrong film from being fed into a developing machine.

SUMMARY OF THE INVENTION

According to this invention, there is provided a splicing table comprising a recess for receiving a patrone containing a film, film positioning pins for positioning the film, a film presser for pressing the film with the film held in position by the film positioning pins engaged in perforations formed in both sides of the film, a cutter means for cutting the film, a splicing portion for connecting a leader to the leading end of the film, a code reader provided in the splicing portion for reading a code indicated on the patrone, and a cutting stop means for selectively activating and deactivating the cutter means according to the result of judgment on whether or not the film can be developed, the judgment being made based on the code data read by the reader.

Preferably, the splicing table has a control circuit for making judgment of whether or not the film is a developable type based on the code data read by the code reader, and outputting a control signal based on the result of such judgment to control the cutting stop means.

After setting a patrone on the splicing table, the film housed therein is pulled out and pressed by the film presser while being held in position by the positioning pins. In this state, the code reader reads a code indicated on the patrone. After judging whether or not the film can be developed, the cutter stop means is activated or deactivated according to the result of such judgment.

If determination is made that the film can be developed, the cutter stop means is released, setting the cutter unit in an operable state. The tongue portion of the film is thus cut by the cutter unit. A leader is then connected to the cut end of the film By means of a splicing tape on the splicing portion. In this state, the film is fed into the developing machine led by the leader.

If judgment is made that the film cannot be developed, the cutter stop means remains unreleased, so that the cutter unit is kept inoperative. Thus, it is possible to positively prevent any wrong film from being fed into a developing machine.

Judgment on whether or not the film can be developed is made by the control circuit. The cutter stop means is released or kept unreleased by a control signal produced according to the result of judgment by the control circuit. All the abovementioned operations are carried out continuously by the single splicing device.

Other features and objects of the present invention will become apparent from the following description made with reference to the accompanying drawings, in which:

DETAILED DESCRIPTION OF PREFERRED EMBODIMENT

Figure 1:
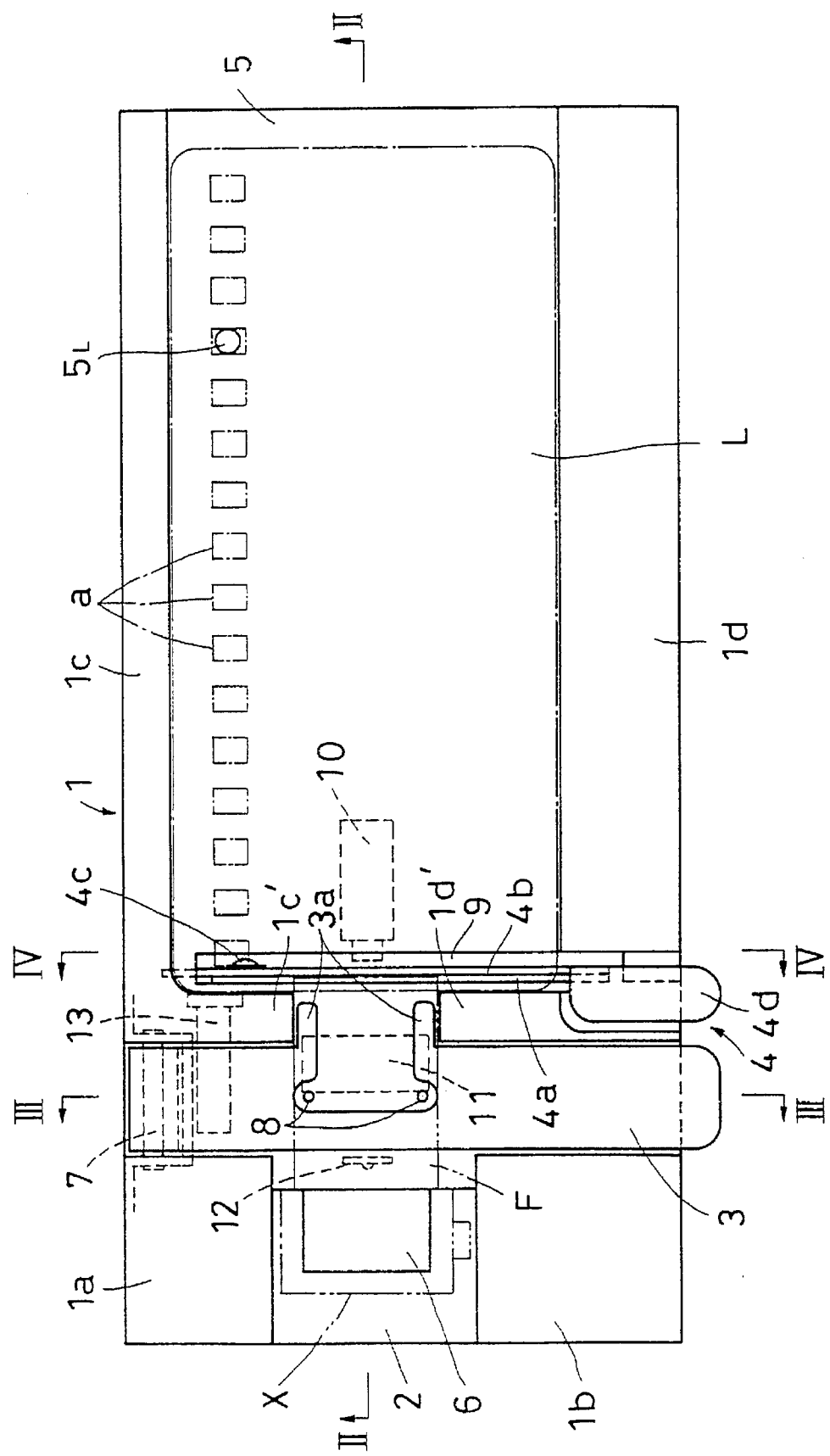
FIG. 1 is a plan view of an embodiment of an entire splicing table of the invention.

Referring now to the drawings, an embodiment of the invention is described.

Figure 2:
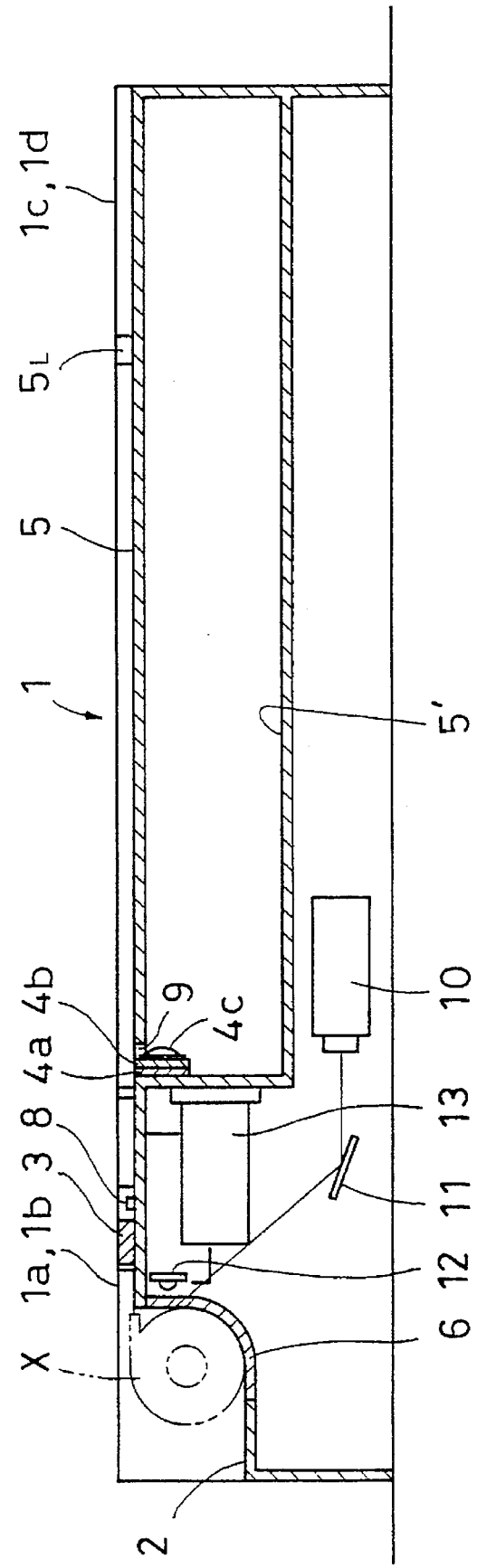
FIG. 2 is a sectional view taken along line II—II of FIG. 1.

FIG. 1 is a plan view of an entire splicing table of embodiment of the invention. The splicing table 1 has substantially the shape of a rectangular box as shown in FIGS. 1 and 2. It has a recess 2 for receiving a patrone X, a film presser 3 for holding a film F in position, a cutter unit 4 for cutting the film, and a splicing portion 5 for connecting a leader L to a leading end of the film.

Peripheral portions 1a–1d of the top surface of the splicing table 1 are in the same horizontal plane. The recess 2, the film presser 3 and the splicing portion 5 are provided between these surface portions as though they are buried therein. Patrone X has usually the shape of a snail shell. The recess 2 is shaped so that it can receive such a patrone (FIG. 2). Numeral 6 indicates a window made of a transparent plastic or glass through which a bar code on the patrone is read.

The film presser 3 is a straight lever extending perpendicular to the direction in which the film is pulled out and is pivotable between open and closed positions about a hinge 7 fixed to the splicing table 1. In the closed position, the film presser 3 fits in a groove formed in the top surface of the splicing table and having a depth substantially equal to the thickness of the presser 3.

The film presser 3 is formed with a fairly wide cutout substantially in the longitudinal center thereof. Positioning pins 8 are provided in the bottom of the groove and extend vertically through the cutout so that they engage in perforations formed in both sides of the film. A pair of presser fingers 3a are provided on both sides of an open end of the cutout. They are spaced from each other by a distance substantially equal to the width of the film.

Film F is held in position on the splicing table 1 by inserting it under the presser fingers 3a until its leading end is inserted in a groove defined between protrusions 1c' and 1d' of side portions of the top surface. The cutter unit 4, which comprises a fixed blade 4a and a movable blade 4b, is provided at the end of such groove to cut a tongue portion of the film F. The movable blade 4b is pivotably mounted on a fixing pin 4c while kept in contact with the fixed blade 4a. The movable blade 4b has a presser 4d at its tip. The tongue cut from the film is dropped through an opening 9.

The splicing portion 5 is a flat-bottomed recess defined between the side portions 1c and 1d of the top surface and having a depth substantially equal to the thickness of a leader L (FIG. 1). A pin 5L is provided on the bottom of the recess 5 and is adapted to engage in one of square holes formed in the leader L.

As shown by dotted lines in FIG. 1, a bar code reader 10 is mounted inside (under) the splicing portion. Under the film presser 3 are a reflecting mirror 11 and a light source 12 (FIG. 2), the former being located closer to the reader 10 than is the latter. A solenoid 13 is provided under the splicing portion 5 near the fixing pin 4c which fixes the fixed blade 4a and the movable blade 4b. It serves to restrict the movement of the movable blade 4b.

FIG. 2 shows a section taken along line II—II (FIG. 1). The bar code on the patrone X is illuminated by the light from the light source 12. Its reflected light is guided to the bar code reader 10 by means of the reflecting mirror 11 so that the reader can read the bar code. A mid-level shelf 5' is provided under the splicing portion 5.

Figure 4:
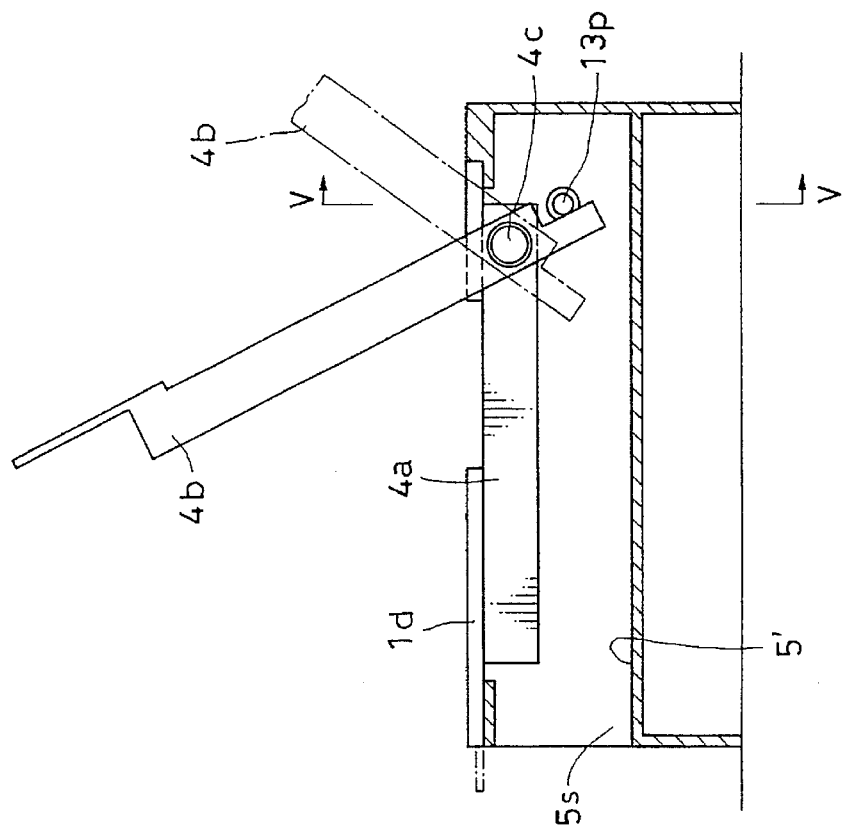
FIG. 4 is a sectional view take along line IV—IV of FIG. 1.
Figure 3:
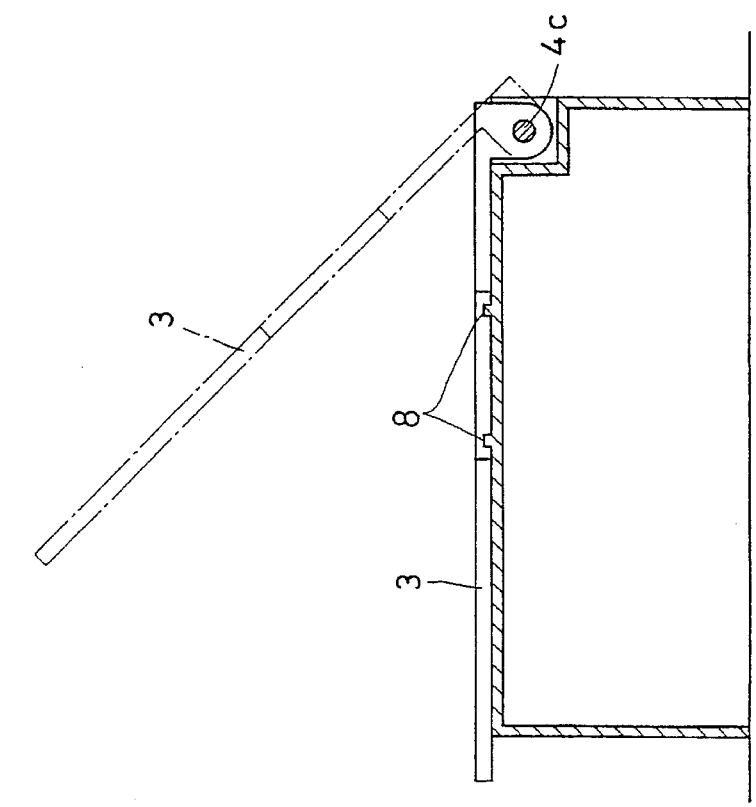
FIG. 3 is a sectional view taken along line III—III of FIG. 1.
Figure 5:
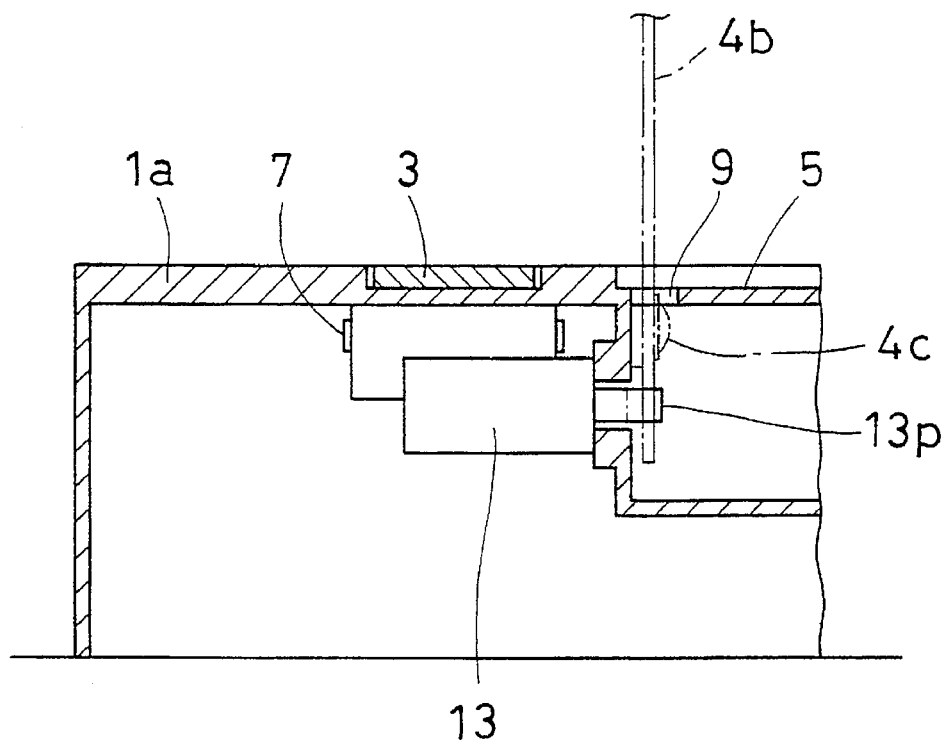
FIG. 5 is a sectional view taken along line V—V of FIG. 4.

FIG. 3 is a section taken along line III—III of FIG. 1 and shows how the film presser 3 is opened and closed. FIG. 4 is a along line IV—IV section of FIG. 1. From this figure, it is apparent how a shaft 13p of the solenoid 13 restricts the pivoting motion of the movable blade 4b by abutting its end. FIG. 5 is a section taken along line V—V of FIG. 4 and seen in the direction of arrows thereof. From this figure, it will be seen that the solenoid 13 restricts the pivoting motion of the movable blade 4b by protruding its shaft 13p. Numeral 5s (FIG. 4) indicates a space formed in the splicing table 1.

Figure 6:
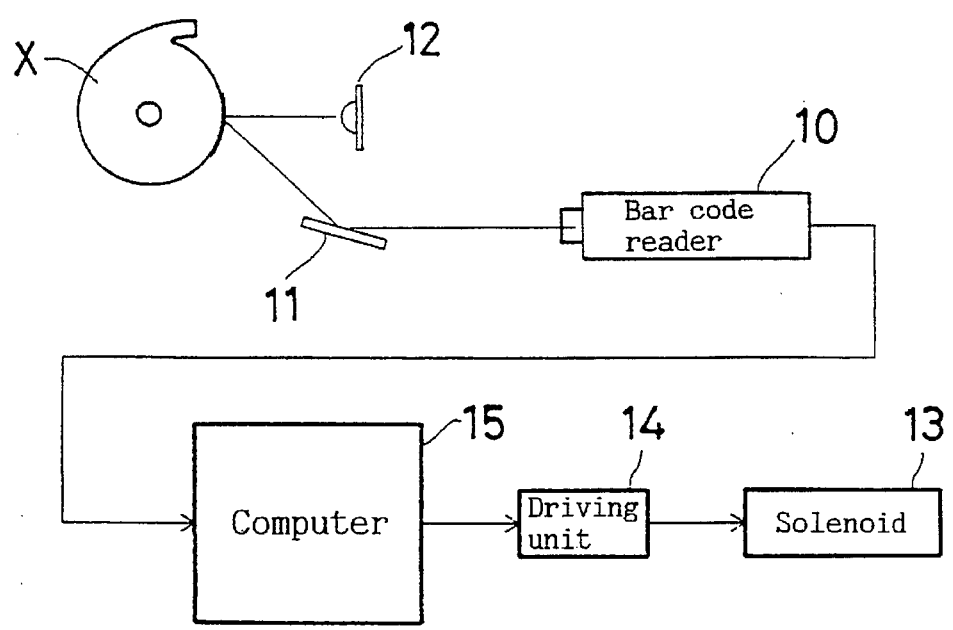
FIG. 6 is a block diagram of an entire control circuit.

FIG. 6 is a block diagram that shows the sequence carried out in a circuit for judging whether or not the film can be developed based on the data obtained by reading the bar code on the patrone X with the bar code reader 10, and controlling the solenoid 13 based on such judgement. The data from the bar code reader 10 are sent to a microcomputer 15, which determines whether or not the film is developable and sends a control signal to a drive unit 14 to drive the solenoid 13.

The operation of how a leader is connected to the end of a film after cutting its end portion on the splicing table now will be described.

Figure 8A:
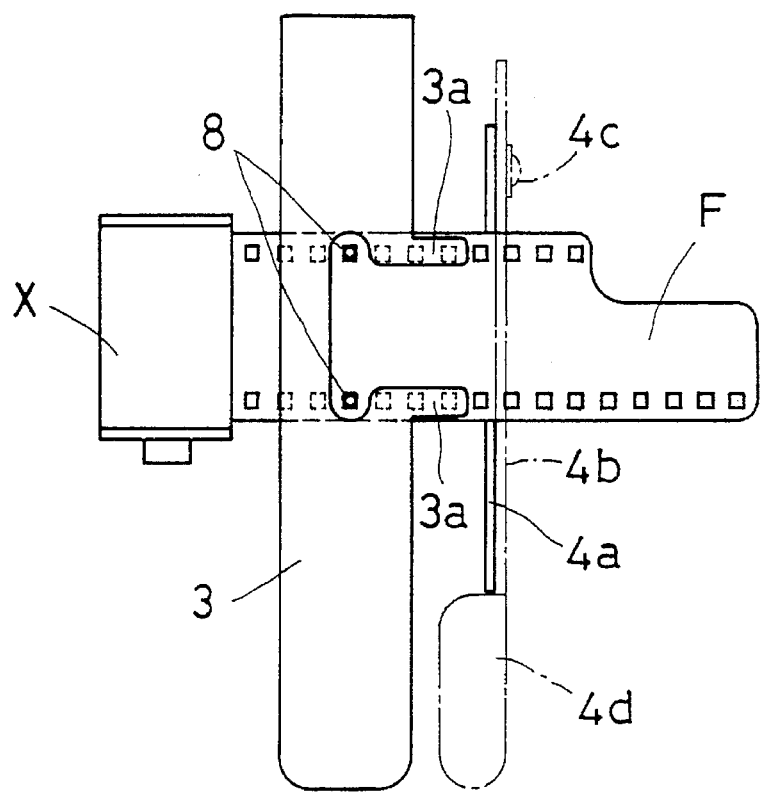
FIGS. 8A and 8B are schematic views showing how a film is cut and connected to a leader.

As shown in FIGS. 1 and 2, a patrone X is set in the recess 2. As shown in FIG. 8A, the film F in the patrone thus set in position is pulled out by a predetermined length and pressed by the film presser 3. The film is positioned by the pins 8 engaged in the perforations in the film.

With the film F thus is held in position, the movable blade 4b of the cutter unit 4 is pivoted to cut the tongue portion of the film F. Before cutting the tongue, the tip of the tongue is inserted in the opening 9. By cutting the tongue from the film in this state, the cut-away tongue drops into a box under the splicing portion 5.

Before cutting the tongue of the film, the bar code reader 10 reads the bar code data, and the computer controls the solenoid 13 based on the bar code data. If the film is judged to be one which cannot be developed, the solenoid is driven so as to prevent a cutting operation by the cutter unit.

Figure 7:
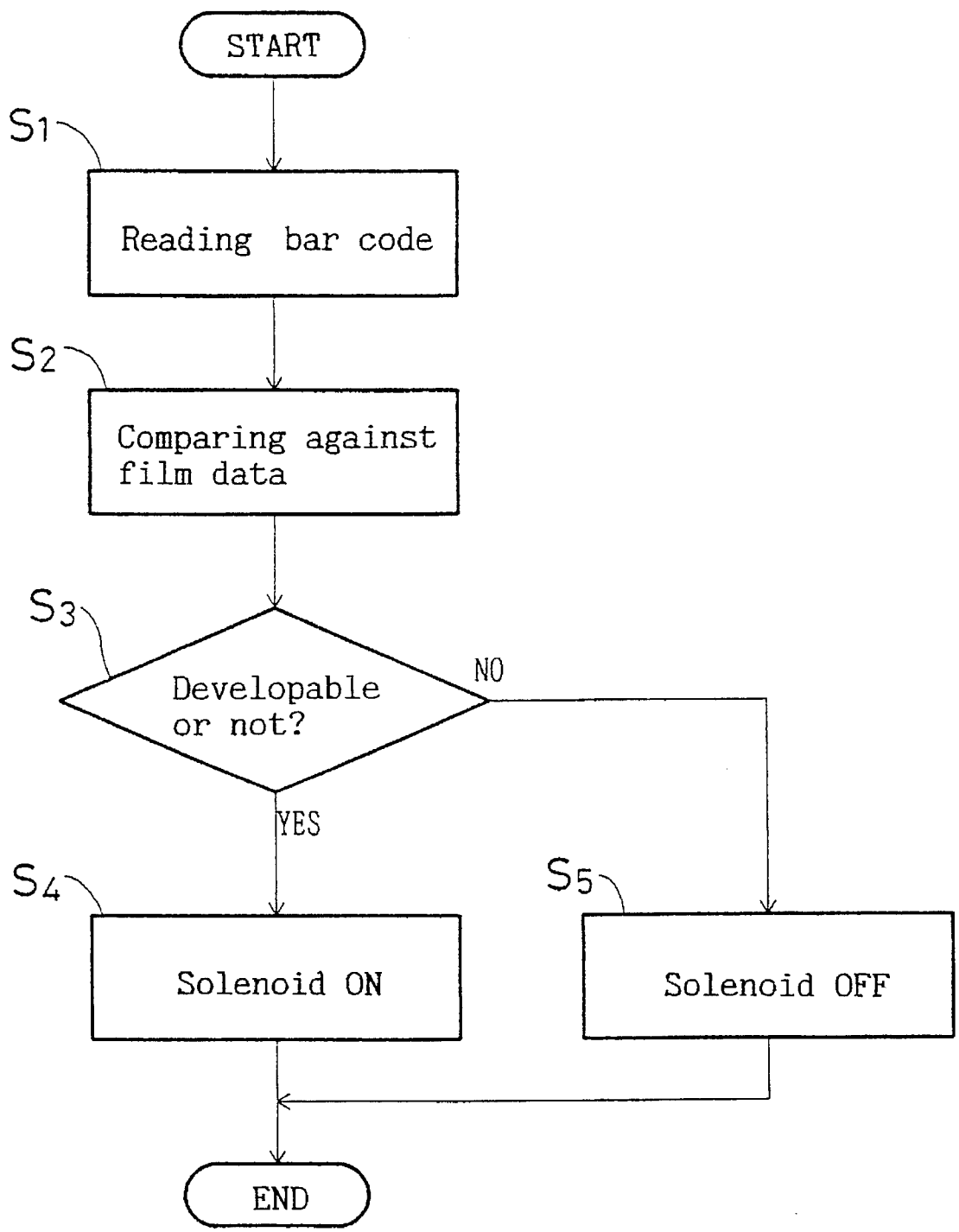
FIG. 7 is a flow chart of control operation of the control circuit.

The solenoid is controlled following the control sequence shown in FIG. 7. When the machine is switched on after setting the patrone X in the recess 2, the bar code on the patrone X is read in Step S1. In Step S2, the bar code data is compared against film data stored in the computer.

The data about films that can be developed in the developing machine with a leader L attached thereto are stored in the computer. More specifically, such data include film manufacturer codes, photographic speeds (ISO100, 200, . . . ), and film types (monocolor, color, reversal, etc.).

Based on the comparison in Step S2, judgment is made in Step S3 whether or not the film is developable. If the bar code data coincides with the data stored in the computer, judgment is made that the film can be developed. Thus in Step S4, a solenoid actuating signal is produced. The shaft 13p of the solenoid 13 will be retracted into the solenoid body, disengaging it from the movable blade 4b. In this state, the movable blade 4b can be turned manually to cut the tongue portion of the film F.

If judgment is made in Step S3 that the film cannot be developed, no actuating signal is sent to the solenoid (in Step S5), keeping the movable blade 4b unmovable. Thus, it is possible to positively prevent any film that cannot be developed from being fed into the developing machine.

Figure 8B:
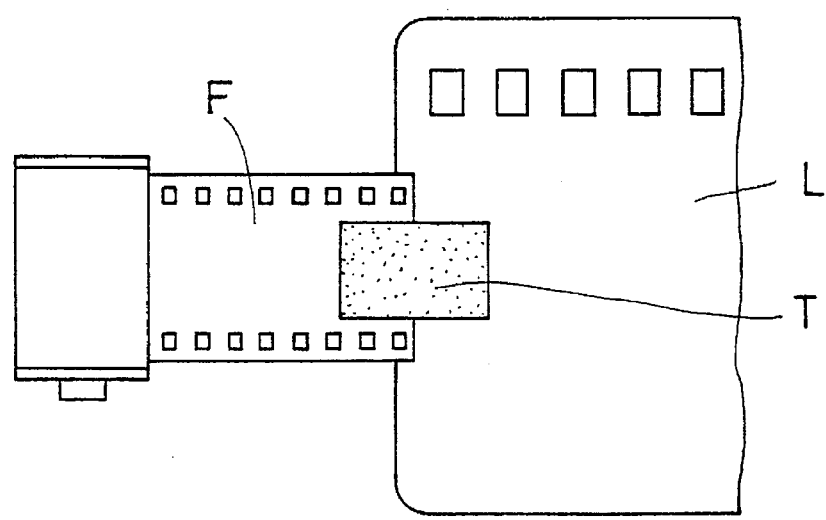

If the film is judged to be developable, its tongue portion is cut off by the movable blade 4b as shown in FIG. 8A, and then a leader L is connected to the cut end of the film F by means of a splicing tape T as shown in FIG. 8B. The film F is then fed into the developing machine led by the leader L and is developed.

What is claimed is:

1. A splicing table comprising:

a recess for receiving a patrons containing a film;

film positioning pins for, when the film is withdrawn from the patrone, positioning the film by said film positioning pins engaging in perforations formed in both sides of the film;

a film presser for pressing the thus positioned film;

a cutter means for cutting the film, said cutter means comprising a fixed blade and a movable blade pivotable between an open position where said movable blade is separate from said fixed blade and a film cutting position where said movable blade is in engagement with said fixed blade;

a splicing unit for connecting a leader to a leading end of a cut film;

a code reader provided in said splicing unit for reading code data indicated on the patrons; and a cutting stop means comprising a shaft movable between a protruded position where said shaft blocks movement of said movable blade from said open position to said film cutting position and a retracted position where said shaft allows movement of said movable blade from said open position to said film cutting position, a solenoid for moving said shaft between said protruded position and said retracted position, and a control means for making judgment of whether or not the film is a developable type based on the code data read by said code reader and for controlling said solenoid based on the result of said judgment to ensure that said shaft is in said protruded position if said judgment is that the film is not a developable type and to move said shaft to said retracted position if said judgment is that the film is a developable type.

\* \* \* \* \*